Patented July 28, 1942

2,291,433

UNITED STATES PATENT OFFICE 2,291,433

MOLDING COMPOSITION AND PLASTIC MATERIALS MADE THEREFROM

Raymond S. Hatch, Longview, Wash., assignor to General Timber Service, Inc., St. Paul, Minn., a corporation of Delaware No Drawing. Original application July 16, 1938, Serial No. 219,600. Divided and this application February 25, 1939, Serial No. 258,471

8 Claims. (Cl. 260—9)

This invention relates to plastic materials and particularly to a method of converting wood products into a non-fibrous plastic material which may be molded readily into any desired form. This application is a division of application Serial No. 219,600, filed July 16, 1938.

Methods have already been developed for the conversion of waste wood into a plastic molding powder by subjecting such waste wood to a more or less drastic hydrolysis either with water or acids at elevated temperatures. Hydrolysis removes certain of the wood constituents such as the so-called hemi-celluloses, thus increasing the ratio of lignin to residual cellulose over that normally present in the wood. The yields resulting from this hydrolysis vary from 60% to 80% of the original wood substance and such material, after being dried and ground, plasticizes readily with the addition of water in limited amounts, alcohols, phenols, or certain hydrocarbon plasticizers. The molded articles produced from such material are in general homogeneous black products having a specific gravity of approximately 1.4. The equipment necessary for carrying on the above mentioned hydrolysis is, however, expensive, and since considerable material is lost in the hydrolysis, the product is relatively costly.

Other processes have been suggested which involve treatment of the wood waste with a solvent for lignin, removing the dissolved lignin and utilizing such lignin as a plastic material in combination with wood flour or other fillers.

It is the object of the present invention to provide a simple, inexpensive and effective method whereby both the lignin and the cellulose components of wood products such as sawdust may be plasticized directly, simultaneously and efficiently to afford a plastic material which can be molded easily with available equipment to produce a multitude of articles of commercial value at relatively low cost.

I have discovered that wood products such as sawdust can be converted readily to a non-fibrous plastic material by mixing with such products a relatively small amount of a primary amine or an agent which is characterized as having a free hydroxyl group. While I do not wish to be restricted to any particular theory, the effect of such treatment is apparently a change in the lignin and cellulose of the wood, which renders it non-fibrous and plastic. When the converted material is subjected to relatively high pressures at fairly low temperatures, it may be molded into any desired shape. The resulting molded articles are free from grain, can be sawed, drilled, planed, sanded and polished. The articles thus produced have a wide variety of commercial uses. In addition to the ordinary uses, such material may be used as an electrical insulator. While the material is ordinarily of a brownish color, its appearance may be modified by the addition of pigments and dyes. Likewise, its characteristics can be changed by the addition of suitable fillers, including abrasives and other materials adapted to give the finished product a specific desired quality.

In carrying out the invention, sawdust, for example, is subjected preferably to preliminary grinding to reduce the particle size. Particle sizes varying from those passing a 200 mesh screen to those passing a 100 mesh screen may be utilized for the purposes of the present invention. Coarser particles are less satisfactory and should be rejected. The finely divided wood products are then mixed thoroughly with a relatively small quantity of a primary amine or an agent having a free hydroxyl group.

There are a number of organic compounds which will combine readily with the lignin component of wood. These compounds may be generally described as primary amines of isocyclic, acyclic, or heterocyclic compounds of carbon or their derivatives. Also isocyclic, acyclic, or heterocyclic compounds containing free hydroxyl groups such as the various alkyl compounds known as alcohols, glycols or ketone alcohols, the aryl compounds known as phenols and the heterocyclic compounds known as alcohols of the furan series.

The preferred agents are primary amines of the alkyl and aryl series or their derivatives. Examples of these compounds are monoethanol amine or other mono amines of the alkyl series. Aniline or substituted primary amines of the aryl series. Naphthylamine and substituted naphthylamine. Examples of the compounds containing free hydroxyl groups include methyl, ethyl, propyl, butyl, isoamyl, diacetone, and benzyl alcohols; also triethylene glycol, ethylene glycol mono ethyl ether, diethylene glycol mono ethyl ether, and cyclohexanol. Similarly, aromatic compounds of a phenolic nature may be used, such as phenol, naphthol, and cresol, and substituted compounds such as chlor, nitro and amino phenols. This by no means exhausts the available materials, but illustrates a wide variety of agents which may be employed successfully in carrying out the method.

As indicated, I employ only a relatively small proportion of the plasticizing agent, for example, from 2 to 10 per cent by weight is sufficient, the amount being such that after thorough mixing the treated wood products are dry. Thorough mixture is particularly essential in view of the relatively small proportion of the plasticizing agent used.

When the material has been thoroughly mixed, it is removed from the mixer in a dry condition and placed in a mold of any suitable form adapted to produce an object of the desired shape and dimensions. In the mold, the material is subjected to a substantial pressure, for example from 2,000 to 4,000 pounds per square inch, the mold being maintained at a temperature between 120° and 170° C. In the mold, the pulverulent material is converted by the heat and pressure employed into a solid, non-fibrous product which, as hereinbefore indicated, has characteristics entirely different from the fibrous material of which it is formed. The lignin and the cellulose fibres are apparently transformed by the action of the plasticizing agent. Obviously, the temperatures and pressures at which the molding is conducted may be varied somewhat, but I have found those stated to be best adapted for the purpose of the invention.

As hereinbefore indicated, it is possible to add various pigments and dyes, as well as fillers and abrasives, to the material before it is subjected to heat and pressure. The amounts to be added will depend upon the results desired, that is to say, the specific properties which are to be introduced in the finished material. The amount of such additions is limited, of course, to the amount which can be added without interfering with the plasticizing and molding of the product. The addition, for example, of too high a percentage of filler would render the material brittle, and in some amounts it would prevent the successful molding of the material by interfering with the plasticizing of the wood products.

The best results are obtained by grinding to the point where at least 80% of the sawdust will pass a 150 mesh screen, the balance being ground fine enough to pass a 100 mesh screen. Finer material may be used, but the tensile strength of the molded product will in general be lower than that produced with material of the described fineness. The finely divided wood is then mixed, for example, with 2% to 10% of its weight of aniline. The moisture content of the mixture is then adjusted so that the water content will be approximately 5%. It is essential that both the aniline and water be thoroughly mixed to form a uniform homogeneous powder which is then removed from the mixer and placed in a mold of any suitable form adapted to produce an object of the desired shape and dimensions. In the mold, the material is subjected to a pressure of from 2000 to 4000 pounds per square inch and the temperature is raised by suitable means to between 120 and 170° C. Under this heat and pressure the pulverant material is converted into a hard dark-colored molded compound of entirely different characteristics from the original wood. It is obvious that pressures greater or less than those indicated in the example may be employed and that temperatures below or above those specified may also be used.

As another example of the procedure, I mix 95 parts by weight of dry, finely divided sawdust, which has been reduced to a condition wherein it will pass a 100 mesh screen, with 5 parts by weight of a plasticizing agent, such for example as ethylene glycol mono ethyl ether. This mixture is agitated until the plasticizing agent is thoroughly disseminated through the mass of dry material. When the material is sufficiently mixed, it is removed in a dry condition and molded at a pressure of from 2,000 to 4,000 pounds per square inch, and at a temperature between 120° and 170° C. A very satisfactory molded product, which may be subjected to all of the usual mechanical operations to improve its surface appearance and to permit shaping for use in any desired structure, is obtained.

I do not limit myself to any specified temperature or pressure but have given those temperatures and pressures which have proven most satisfactory. It is also obvious that mixtures of the different chemical compounds may be used as plasticizers. For example, amines and phenols may be mixed in suitable proportions or amines and alcohols or other desirable combinations. Pigments and fillers may be added to produce suitable artistic or useful effects.

There is an almost inexhaustible source of wood products, such as sawdust, which have never been utilized successfully heretofore except as fuel or insulating material. The present method permits the conversion of such waste material into a highly valuable product which is adapted for numerous uses. The product can be molded into substantially any shape for which a suitable die can be developed. The product is relatively strong, presents a hard and wear-resistant surface, has good electrical insulating properties and numerous other characteristics which make it a desirable commercial material. Furthermore, both the raw material and the method by which it is treated are inexpensive, so that the products may be manufactured at relatively slight expense and as a substitute for more expensive and less satisfactory plastic materials which are now available.

Various changes may be made in the method and particularly in the wide variety of available plasticizing agents without departing from the invention or sacrificing any of its advantages.

I claim:

1. A molding composition consisting of a relatively dry mixture of finely divided wood in its natural state and a compound from the class consisting of aliphatic alcohols, alcohols of the furan series, cyclohexanol, and benzyl alcohols, as the essential constituents thereof.

2. A molding composition consisting of a relatively dry mixture of wood in its natural state and of a particle size such that the major portion thereof will pass a 100 mesh screen and a compound from the class consisting of aliphatic alcohols, alcohols of the furan series, cyclohexanol, and benzyl alcohols, as the essential constituents thereof.

3. A molding composition consisting of finely divided wood in its natural state and from about 2% to 10% of a compound from the class consisting of aliphatic alcohols, alcohols of the furan series, cyclohexanol, and benzyl alcohols, as the essential constituents thereof.

4. A molding composition consisting of a relatively dry mixture of wood in its natural state and of a particle size such that the major portion thereof will pass a 100 mesh screen and from about 2% to 10% of a compound from the class consisting of aliphatic alcohols, alcohols of the furan series, cyclohexanol, and benzyl alcohols, as the essential constituents thereof.

5. A molding composition consisting of finely divided wood in its natural state and from about 2% to 10% of an aliphatic alcohol, as the essential constituents thereof.

6. A dense, compressed plastic material made from the molding composition set forth in claim 1.

7. A dense, compressed plastic material made from the molding composition set forth in claim 3.

8. A dense, compressed plastic material made from the molding composition set forth in claim 5.

RAYMOND S. HATCH.